US009514345B1

(12) United States Patent
Qaddoura et al.

(10) Patent No.: US 9,514,345 B1
(45) Date of Patent: *Dec. 6, 2016

(54) WEARABLE SCANNERS

(71) Applicant: Amazon Technologies, Inc., Seattle, WA (US)

(72) Inventors: Fareed Adib Qaddoura, Bellevue, WA (US); Keith Francis Deacon, Monroe, WA (US); Mohan Krishna Rao, Mississauga, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,060

(22) Filed: Jan. 7, 2016

Related U.S. Application Data

(63) Continuation of application No. 14/108,801, filed on Dec. 17, 2013, now Pat. No. 9,235,742.

(51) Int. Cl.
*G06K 7/10* (2006.01)
*G06K 7/14* (2006.01)

(52) U.S. Cl.
CPC ......... *G06K 7/10891* (2013.01); *G06K 7/1413* (2013.01); *G06K 7/1417* (2013.01); *G06K 7/1447* (2013.01)

(58) Field of Classification Search
CPC .............................. G06K 7/10881; G06T 3/60
See application file for complete search history.

(56) References Cited

U.S. PATENT DOCUMENTS

| 9,235,742 B1 * | 1/2016 | Qaddoura ................. G06T 3/60 |
| 2006/0108425 A1 | 5/2006 | Wiklof |
| 2014/0249944 A1 | 9/2014 | Hicks et al. |

* cited by examiner

*Primary Examiner* — Kristy A Haupt
(74) *Attorney, Agent, or Firm* — Athorus, PLLC

(57) ABSTRACT

Wearable scanners or readers may be mounted to and operated from at least one extension of the human body, such as a portion of a hand or wrist of a user. The wearable scanners or readers may include one or more manual or automatic actuators for initiating a scanning or reading of a marking on an object. Such actuators may be worn about the portion of the hand or wrist of the user, including within a palm of the hand, or in a ring-like device surrounding at least one finger of the hand. Additionally, the wearable scanners or readers may include optical elements configured to capture images in one or more directions or along one or more axes, and may further include any type of display elements (e.g., touchscreens, LED or LCD displays, or electrophoretic displays) formed in substantially flat or curved shapes.

20 Claims, 14 Drawing Sheets

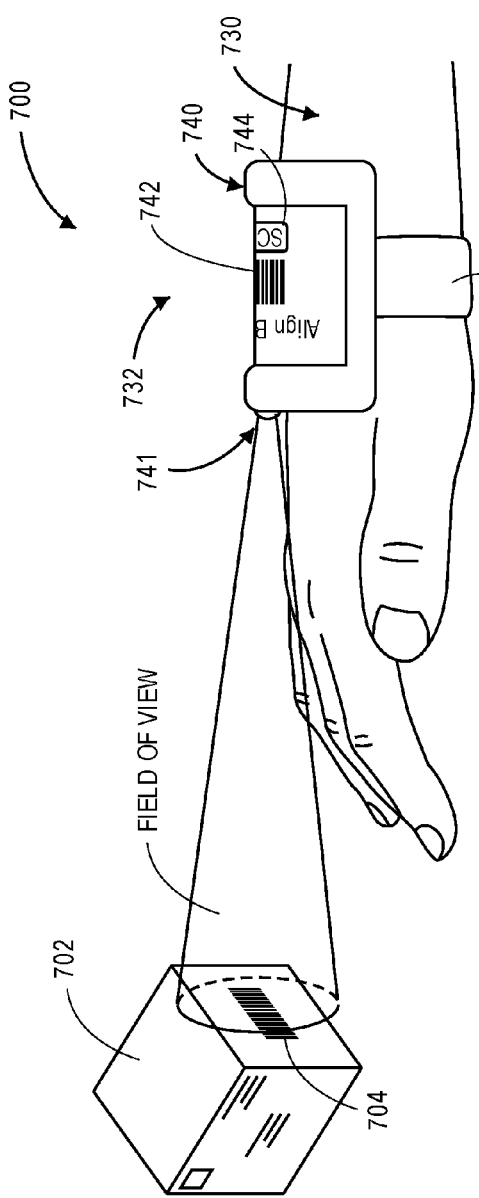
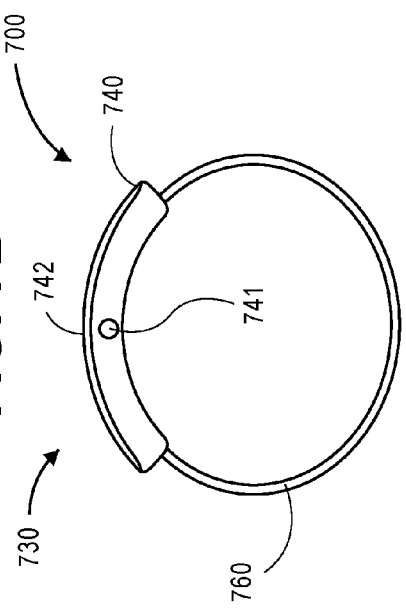
FIG. 7B
FIG. 7C

WEARABLE SCANNERS

CROSS-REFERENCE TO RELATED APPLICATIONS

This application is a continuation of U.S. patent application Ser. No. 14/108,801, filed Dec. 17, 2013, the contents of which are incorporated by reference herein in their entirety.

BACKGROUND

Computer systems are commonly used to register or otherwise acknowledge the presence, transfer or arrival of an item, an object, a person or a thing. For example, computer systems may be used to acknowledge an influx of luggage or passengers at an airport, a receipt of packages at a shipment facility or a return of a book at a library. Such systems may be connected to a network and/or one or more database or data store, and may include any number of peripherals for receiving entries of data or information from users.

One common manner in which items, objects, people or things may be registered with a computer system is through the use of a scanner or reader, which may be configured to acknowledge or optically recognize text, numbers or other identifiers (e.g., a one-dimensional bar code or a two-dimensional quick response bar code, or "QR" bar code) that may be printed, written, affixed, marked or otherwise associated with an item, an object, a person or a thing. Scanners or readers may be used in any number of environments or facilities such as train stations, shopping centers or warehouses, where such scanners or readers may optically scan, read or otherwise evaluate a train ticket, an item to be purchased, or a shipment of items that has arrived or is scheduled to depart.

Originally associated with large, fixed consoles or machines, scanners or readers are now typically associated with handheld computing devices taking the form of guns or other grippable machines. In a fulfillment and distribution center, where items may be received from external sources, placed into storage, packed into containers, prepared for delivery to a customer and/or shipped to the customer, workers may use a scanner or reader to interpret bar codes, text or numbers printed on an invoice, shipping label, tag or container. For example, a worker may be provided with a list of items to be retrieved from the fulfillment center, and may use a handheld scanner or reader to acknowledge his retrieval of each of the items, or his delivery of the items to an ultimate destination. The worker may locate an item, hold or grip the item in one hand, identify an identifier affixed or labeled thereon, and use the handheld scanner or reader to scan the identifier with the handheld scanner or reader.

Despite the efficiencies that may be theoretically achieved through the use of computing systems in general, and of handheld scanners or readers in particular, when registering or acknowledging the presence, transfer or arrival of items, objects, people or things, the actual use of such systems or devices may result in some unexpected or undesired circumstances. For example, a worker's manual use of a handheld scanner or reader to identify items typically requires the worker to stop his or her motion, to place an item in a field of view of the scanner or reader with one hand and to command the scanner or reader to capture an image of a portion of the item with another hand. The break in motion, and the described events, must be repeated for each and every instance in which an item is to be recognized. Additionally, because handheld scanners or readers are operated by hand, such devices may be easily broken, misplaced or surreptitiously obtained by unauthorized personnel. Moreover, much of the mass of a handheld scanner or reader is devoted to plastic or other materials comprising grips or supports about which users may handle and manipulate such devices. For at least this reason, handheld scanners typically weigh two pounds or more.

BRIEF DESCRIPTION OF THE DRAWINGS

FIGS. 7A, 7B and 7C are views of systems including wearable scanners, or components thereof, in accordance with embodiments of the present disclosure.

DETAILED DESCRIPTION

Figure 1A:
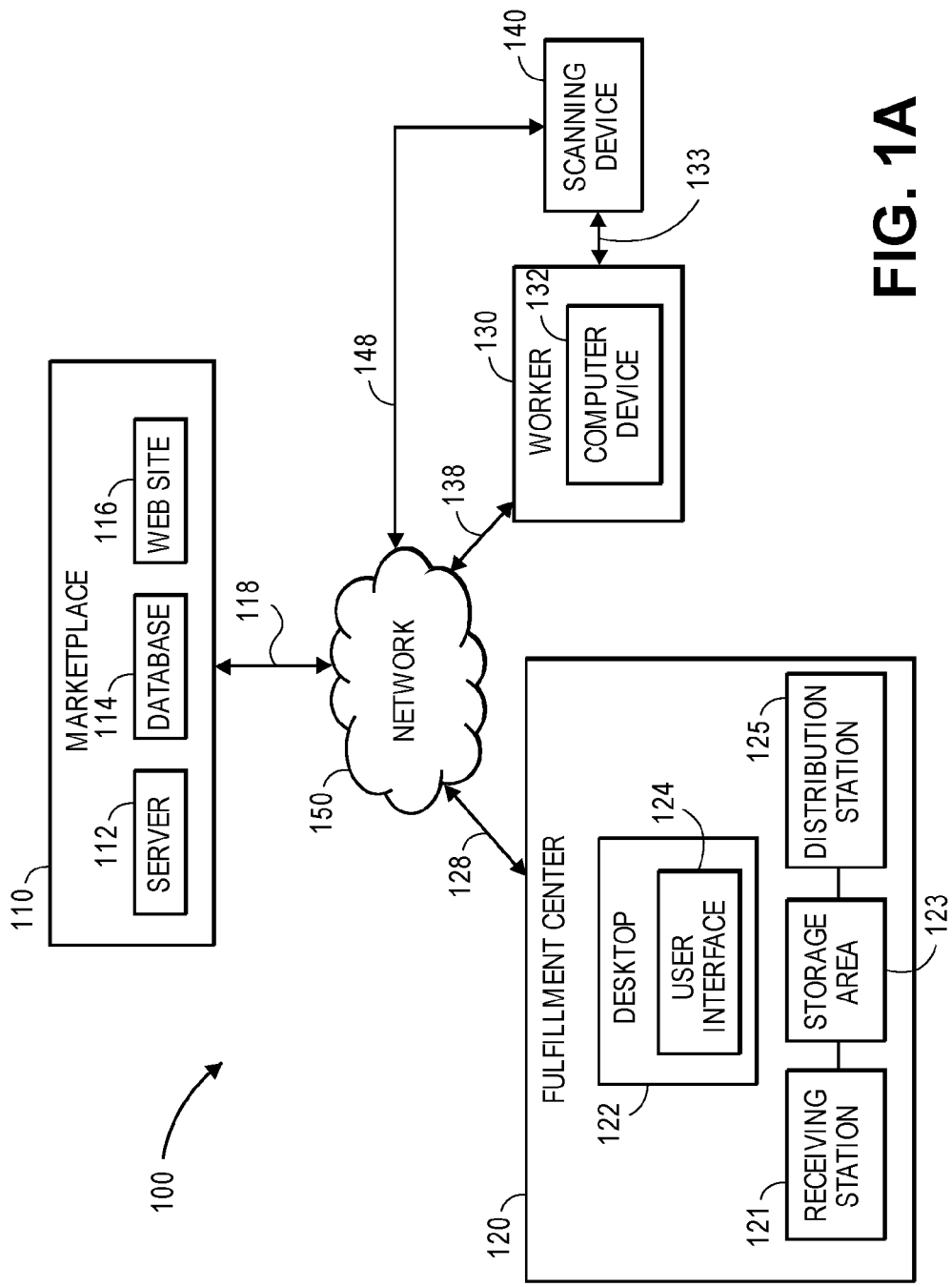
FIGS. 1A and 1B are block diagrams of systems including a wearable scanner, in accordance with embodiments of the present disclosure.

As is set forth in greater detail below, the present disclosure is directed to durable, easy-to-use and readily available scanning equipment or components (or reading equipment or components) that may be worn on a body of a user. Specifically, the systems and methods disclosed herein may include one or more scanning apparatuses (or reading apparatuses) that may be worn on a human body, such as by a worker in a warehouse, a library, a shopping center or other large facility featuring a number of items having scannable or readable content in the form of codes, text, numbers, symbols, trademarks, shapes, outlines, figures or other information or data. Such systems and methods may further include easily accessible and operable interfaces, as well as portable and versatile communications equipment, which enable users to quickly and efficiently conduct one or more scanning operations.

Computer users may operate many different types of optical scanners or readers in order to interpret printed markings or content. Such scanners or readers may be used to identify and recognize letters, numbers or other machine-readable representations of data, such as bar codes. A scanner may capture one or more images of a side or facet of an object having a one-dimensional or QR bar code marked therein, and the bar code may be identified or interpreted using one or more formulas or algorithms may be pre-programmed or otherwise trained to recognize such codes. As such, bar codes may be efficiently used to associate information with an item, by making the information accessible through data associated with the bar code, which may be affixed or applied to the item, and associated with a hyperlink or other means for accessing the information. For example, bar codes are presently used in many applications to recognize items and/or the contents thereof. Such applications may include the purchase and sale of retail items, which may have a Universal Product Code (or "UPC") or other bar code identifier affixed thereon, as well as the delivery, by a common carrier, of one or more packages or parcels having shipping labels featuring bar codes applied thereto.

In order to read or interpret a bar code applied to an item using a scanner or reader, the item must be positioned within a vicinity of the scanner or reader, and with a specific orientation with respect to an optical element of the scanner or reader, to a particular degree of accuracy or precision. Therefore, a user may be required to exert a fair amount of effort that is unrelated to the task for which the reading or interpretation of the bar code is desired. For example, positioning an item for reading or interpretation by the scanner or reader frequently requires a user thereof to halt or restrict any other activities, in order to concentrate on orienting the item and the scanner or reader correctly. Moreover, depending on the size of the item, as well as the size of the scanner or reader, the physical task of properly orienting the item and the scanner or reader may be daunting as well, particularly in industrial applications or other situations involving heavy items or equipment. Likewise, when a scanner or reader is utilized in scenarios in which users are required to wear gloves or encounter dirt or other fouling and debris, the manipulation of one or more buttons or features on the scanner or reader may be difficult.

The systems and methods disclosed herein are directed to improved devices for scanning or reading codes, text, numbers, symbols, trademarks, shapes, outlines, figures or other markings on one or more items (i.e., objects, people or things), including but not limited to devices that may be worn or carried on a human body. Such devices may be conveniently oriented to enable a user to view or operate the devices while performing one or more tasks, and may include convenient, easy-to-use actuators or other accessories. Using one or more of the systems or methods disclosed herein, a user may scan or read any form of marking, such as a bar code, and may register any type of item accordingly.

According to one embodiment of the present disclosure, a computing device for scanning or reading a marking may be provided with a scanning or reading implement oriented substantially laterally with respect to a user's hand, i.e., mounted about a back, or a posterior, of the user's hand, as well as an actuator mounted within a durable, compressible, reformable and substantially spherical ball that may be gripped within a palm, or an anterior, of a user's hand. The actuator may include one or more selectable buttons, triggers or other interactive operators oriented within a vicinity of at least one of the user's digits. The actuator may also be formed of or comprise a rubber-like or leather-like elastomeric material that may be easily compressed, but may also return to form upon a removal of a compressive force. During operation, the flexible and durable properties of the actuator permit the user to use a hand in which the actuator is positioned, such as by carrying one or more objects, or pushing or otherwise providing a force to one or more carts, trucks or other conveying systems. When the user intends to scan or read a bar code or other marking on one more items, however, the user may operate one or more of the buttons, triggers or other operators on the actuator with one or more of his or her digits.

According to another embodiment of the present disclosure, a computing device for scanning or reading a marking may be provided on a hand-based or wrist-based mount that may swivel, pivot or hinge in order to orient a display screen on the computing device for easy viewing by a user on which the computing device is worn. The hand-based or wrist-based mount may include one or more mechanized features for rotating the computing device about one or more axes, or translating the computing device within one or more planes. The computing device may further include one or more sensors for recognizing or tracking a position of a user's face. Once the user's face has been located, the computing device may be automatically repositioned in a manner that orients the display screen within a field of view of the user's face, thereby enabling the user to more easily view content rendered on the display screen while using his or her hands for performing manual labor.

According to yet another embodiment of the present disclosure, components of scanning or reading systems may be mounted to a user's hand or wrist, and may include one or more optical devices oriented about a digit of the user's hand, and extending forward in advance of the user's hand. Such scanning or reading systems may further include an actuator mounted within a ring-like operator positioned on a digit, i.e., a finger or thumb, of the user's hand. The optical devices may be commanded to scan or read markings in front of the user's hand upon an initiation or triggering of the actuator. Additionally, such scanning or reading systems may include any number or type of computing device components, including a full slate of processors, memory and communications components, or, alternatively, only the minimum components required to capture an image of a bar code or other marking, e.g., an optical device and an actuator, as well as a transmitter for transmitting information to an external system and a power supply. In this regard, the weight and complexity of the device worn by the user may be minimized, while enhancing the efficiency of the scanning or reading process without sacrificing processing or analytical power.

According to still another embodiment of the present disclosure, a scanning or reading system may be formed of an arcuate and/or flexible shape, and may substantially conform to a back, or a posterior, of a user's hand. The structure and/or framework of the scanning or reading system may be made of any number of moldable or formable materials, such as elastic rubbers or other elastomeric materials, or pre-molded plastics. Further, the scanning or reading system may include a display screen that is pre-formed into an arcuate shape for conforming to most users' hands, or that includes a flexible display element, such as an electrophoretic display, or electronic ink (or "E-ink") display, which may provide advantages of high readability, high resolution and high reflectivity in most light conditions, as well as very low energy requirements as compared to standard displays, thereby permitting battery lives to be extended. Furthermore, those of ordinary skill in the pertinent art recognize that an electrophoretic display is flexible, not rigid, and may be provided in scanning or reading systems formed of sufficiently bendable or twistable components.

The scanning or reading systems and methods disclosed herein may be worn and used by one or more workers in any number of applications. For example, one or more scanning or reading systems may be worn by workers of a common carrier (e.g., deliverymen or deliverywomen), who may acknowledge their acquisition or receipt of an object, announce a departure for delivery, or confirm a deposit of an item at a given location or address using one or more of the systems or methods disclosed herein. Similarly, one or more scanning or reading systems may be worn by maintenance workers, who may confirm their arrival at a location, their performance of a specific task at the location, or their departure from the location using one or more of the systems or methods disclosed herein. Further, some of the embodiments disclosed herein may be easily worn or used while conducting physically taxing tasks, such as carrying heavy objects or operating equipment, and some of the embodiments disclosed herein may utilize, or be incorporated with, standard computing devices that are known to those of ordinary skill in the pertinent art.

Figure 1B:
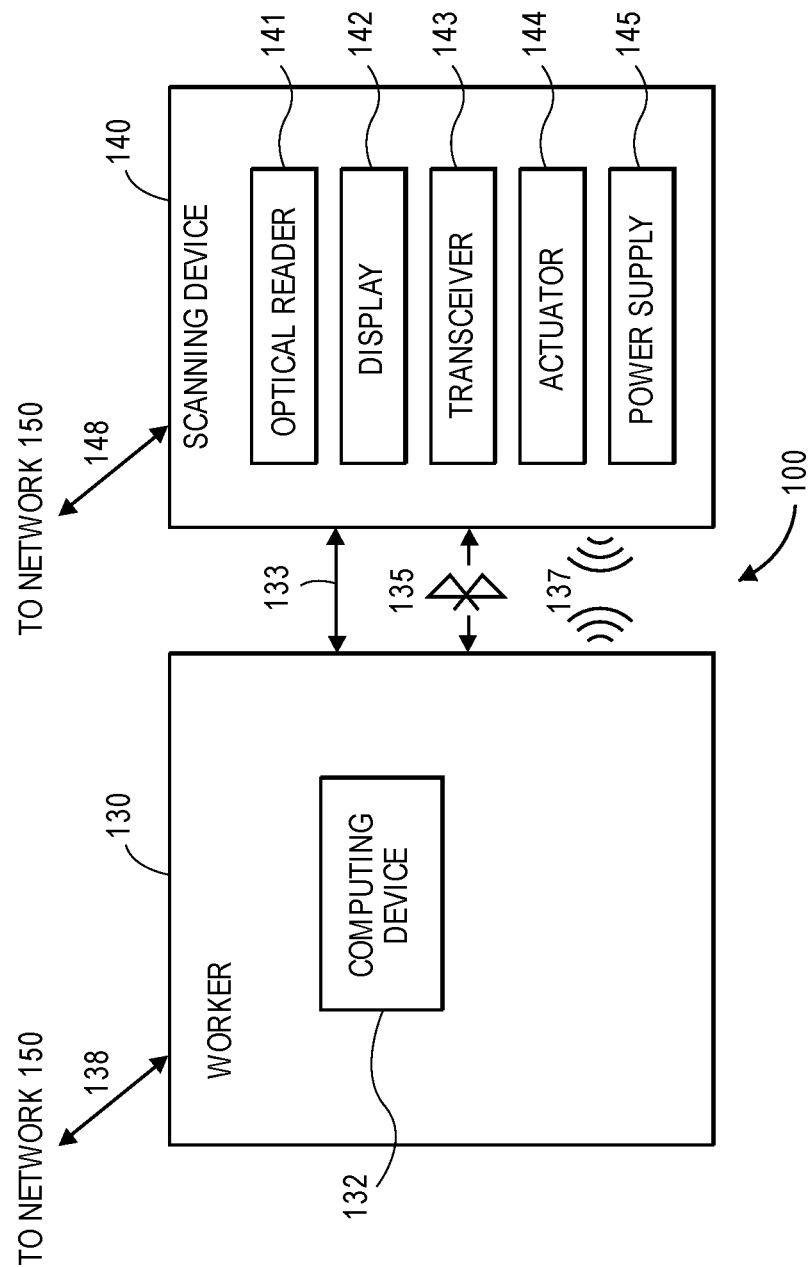

Referring to FIGS. 1A and 1B, a block diagram of one system 100 in accordance with the present disclosure is shown. Although the system 100 of FIGS. 1A and 1B incorporates some of the systems and methods of the present disclosure in the fulfillment of orders for items placed through an online marketplace in an electronic commerce environment, those of ordinary skill in the pertinent art would recognize that such systems and methods are not so limited, and may be employed in any application requiring a computer-based acknowledgment or registration of an item, an object, a person or a thing.

As is shown in FIG. 1A, the system 100 includes a marketplace 110, a fulfillment center 120 and a worker 130 having a scanning device 140. The marketplace 110, the fulfillment center, the worker 130 and/or the scanning device 140 may be connected to one another across a network 150, such as the Internet. The marketplace 110 may be any entity or individual that wishes to make items from a variety of sources available for download, purchase, rent, lease or borrowing by customers using a networked computer infrastructure, including one or more physical computer servers 112 and databases 114 for hosting a web site 116. The marketplace 110 may be physically or virtually associated with one or more storage or distribution facilities, such as the fulfillment center 120. The web site 116 may be implemented using the one or more servers 112, which connect or otherwise communicate with the one or more databases 114 as well as the network 150, as indicated by line 118, through the sending and receiving of digital data. Moreover, the databases 114 may include any type of information regarding items that have been made available for sale through the marketplace 110, or ordered by customers from the marketplace 110, or any type of information regarding items that have been received at, stored in, or delivered from, the fulfillment center 120.

The fulfillment center 120 may be a facility or complex that is adapted to receive, store, process and/or distribute items on behalf of the marketplace 110. As is shown in FIG. 1A, the fulfillment center 120 may operate one or more order processing and/or communication systems using a computing device such as a desktop computer 122 and/or software applications having one or more user interfaces 124 (e.g., a browser or other dedicated application), or through one or more other computing machines that may be connected to the network 150, as is indicated by line 128, in order to transmit or receive information in the form of digital or analog data, or for any other purpose. The desktop computer 122 may also operate or provide one or more interfaces, such as the user interface 124, for receiving interactions (e.g., text, numeric entries or selections) from one or more operators, users or workers in response to such information or data.

The fulfillment center 120 may also include a receiving station 121, a storage area 123 and a distribution station 125. The receiving station 121 may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft, and preparing such items for storage or distribution to customers. The storage area 123 may include one or more pre-defined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 125 may include one or more regions or stations where items that have been retrieved from a designated storage area may be evaluated, prepared and packed for delivery to addresses, locations or destinations specified by customers.

The fulfillment center 120 may further include one or more control systems that may generate instructions for conducting operations at one or more of the receiving station 121, the storage area 123 or the distribution station 125, which may be associated with the desktop computer 122 or one or more other computing machines, and may communicate with the marketplace 110 or the worker 130 over the network, as indicated by line 128, through the sending and receiving of digital data. Additionally, the fulfillment center 120 may include one or more other systems or devices (not shown in FIG. 1A) for determining a location of one or more elements therein, such as cameras or other image recording devices.

The fulfillment center 120 may also include one or more workers or staff members, such as the worker 130, for handling or transporting items within the fulfillment center 120, such as from a car, truck, ship or aircraft to a crane, jack, belt or another conveying apparatus at the receiving station 121 to a shelf, bin, rack, tier, bar, hook or other storage means within the storage area 123, or to a defined region within the distribution station 125. Moreover, the worker 130 may operate one or more computing devices for registering the receipt, retrieval, transportation or storage of items within the fulfillment center, such as a computer device 132, which may be a device that is specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices.

The worker 130 may further operate or maintain a scanning device 140, which may be physically joined to or incorporated with the computer device 132, or a free-standing device that may communicate with the worker 130 or the computer device 132, or with the marketplace 110, the fulfillment center 120 or any other systems or entities (not shown), through one or more other computing machines that may be connected to the network 150, as is indicated by line 148. The scanning device 140 may include any number of elements, components or features for capturing and interpreting one or more images of any kind of marking (e.g., codes, text, numbers, symbols, trademarks, shapes, outlines or figures) that may be known to those of ordinary skill in the pertinent art, as well as any type of computing elements, components or features that may be required to capture or interpret such images.

The computers, servers, devices and the like described herein have the necessary electronics, software, memory, storage, databases, firmware, logic/state machines, microprocessors, communication links, circuits or circuit boards, displays or other visual or audio user interfaces, printing devices, and any other input/output interfaces in order to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "worker" or a "scanning device" may be automated steps performed by their respective computer systems which may be dedicated to the performance of such steps, or implemented within software modules (or computer programs) executed by one or more general purpose computers. Moreover, process steps described as being performed by a "marketplace," a "fulfillment center," a "worker" or a "scanning device" may be typically performed by a human operator, e.g., via the desktop computer 122, the computer device 132 or the scanning device 140, but could, alternatively, be performed by an automated agent.

The fulfillment center 120 and/or the worker 130 may use any web-enabled or Internet applications or features, such as the user interface 124, or any other client-server applications or features including electronic mail (or E-mail), or other messaging techniques, to connect to the network 150 or to communicate with one another, such as through short or multimedia messaging service (SMS or MMS) text messages. For example, in addition to the desktop computer 130, the computing device 132 or the scanning device 140, those of ordinary skill in the pertinent art would recognize that the marketplace 110, the fulfillment center 120 and/or the worker 130 may operate any of a number of computing devices that are capable of communicating over the network, including but not limited to set-top boxes, personal digital assistants, digital media players, web pads, smartphones, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or servers, such as the server 112, the desktop computer 122, the computer device 132, the scanning device 140, or any computers or control systems utilized by the marketplace 110, the fulfillment center 120 or the worker 130 and having sequences of instructions which, when executed by a processor (such as a central processing unit, or CPU), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal. Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of using wearable scanning or reading devices when fulfilling orders for one or more items at a fulfillment center or other storage facility, such as the fulfillment center 120 shown in FIG. 1A, that were placed through a web site maintained on behalf of an online marketplace by one or more customers, such as the web site 116 maintained by the marketplace 110, as are shown in FIG. 1A. As will be recognized by those of skill in the art, however, the systems and methods disclosed herein may also be used in many other situations, and their utility is not limited to any of the preferred embodiments described herein.

Referring to FIG. 1B, some features or elements of components of the system 100 of FIG. 1A are shown. As is shown in FIG. 1B, the worker 130 and/or the computing device 132 may be connected to the scanning device 140 by any means, including a hardwired or physical connection 133 (e.g., a Universal Serial Bus, or "USB," connection), a short-range wireless connection 135 (e.g., according to Bluetooth® or another protocol) or a standard wireless fidelity (or "WiFi") connection 137.

As is also shown in FIG. 1B, the scanning device 140 may include an optical reader 141, a display 142, a transceiver 143, an actuator 144 and a power supply 145. The scanning device 140 may be fixed to the computing device 132, or may be portable, i.e., a batch reader that captures and stores images for subsequent transmission to an external device, such as the computing device, or an active reader that captures, stores and transmits such images to the external device in real-time. Those of ordinary skill in the pertinent art would recognize that the worker 130 and/or the computing device 132, and the components of the scanning device 140, may be connected or associated with one another in real time, or in near-real time, and in a synchronous or asynchronous manner, depending on the applications in which the corresponding systems and methods are used.

The optical reader 141 may be include any form of image capturing device, such as a camera, scanner or other device for identifying markings such as codes, text, numbers, symbols, trademarks, shapes, outlines or figures of any breadth, width or density, and generating an electrical output corresponding the captured markings. The optical reader 141 may transfer the electrical output to the computing device 132 or another system component via the network 150, where the electrical output may be decoded and interpreted, and subsequently utilized in one or more applications, such as to acknowledge or register an item with which the markings are associated. Additionally, the optical reader 141 may be adapted to capture images about any axis and in any plane.

The display 142 may provide any form of information regarding the operations of the scanning device 140, the computing device 132, or any other component. For example, the display 142 may provide information or instructions regarding a specific item having a marking to be scanned or read, or a location of the specific item, or any other form of information. Moreover, the display 142 may include any type of display element, including a liquid crystal display (or "LCD"), a touchscreen display (e.g., a capacitive or resistive touchscreen), an E-ink display, a light emitting diode (or "LED") display, such an organic light emitting diode (or "OLED") display, or any other form of display element.

The transceiver 143 may include any components, elements or features for transmitting information to and/or receiving information from an external source, such as the computing device 132, or any other computing device via the network 150. For example, the transceiver 143 may be adapted to communicate with the computing device 132 or to other devices via the network 150 using the hardwired or physical connection 133, the short-range wireless connection 135 or the standard WiFi connection 137, or any other means (not shown).

The actuator 144 may be any physical or virtual means by which a scanning or reading of a marking may be initiated or otherwise triggered. For example, the actuator 144 may be manual in nature, i.e., a trigger or other manually operated button, or may include one or more virtual triggers or buttons rendered on a touchscreen, such as the display 142. Additionally, the actuator 144 may be automatically controlled through an external source, such as the computing device 132, or an operator thereof, such as the worker 130. The actuator 144 may be further adapted for continuous operation, and may capture an image of a marking upon an acknowledgment or recognition that the marking is of a type (e.g., a code, a text character, a number, a symbol, a trademark, a shape, an outline or a figure) for which a scanning or reading is desired.

The power supply 145 may include any means for providing necessary power to the scanning device 140, including one or more batteries, cells, capacitors or other power-generating components, as well as one or more wired or wireless connections to an external power source. The power supply 145 may operate using alternating current (AC) or direct current (DC), and may be energized and/or charged by any means known to those of ordinary skill in the pertinent art, including a wired connection to the external power source, or through a wireless charging connection such as an inductive charging system providing an electromagnetic field and/or an inductive coupling between a base station (not shown) and the power supply 145.

As is discussed above, the present disclosure is directed to scanning systems and methods having wearable components and features that are readily accessible and easy-to-use. Referring to FIGS. 2A, 2B, 2C, 2D, 2E and 2F, a system 200 including a wearable scanning device 240 according to the systems and methods of the present disclosure is shown. Except where otherwise noted, reference numerals preceded by the number "2" in FIG. 2A, 2B, 2C, 2D, 2E or 2F indicate components or features that are similar to components or features having reference numerals preceded by the number "1" shown in FIG. 1A or FIG. 1B.

Figure 2A:
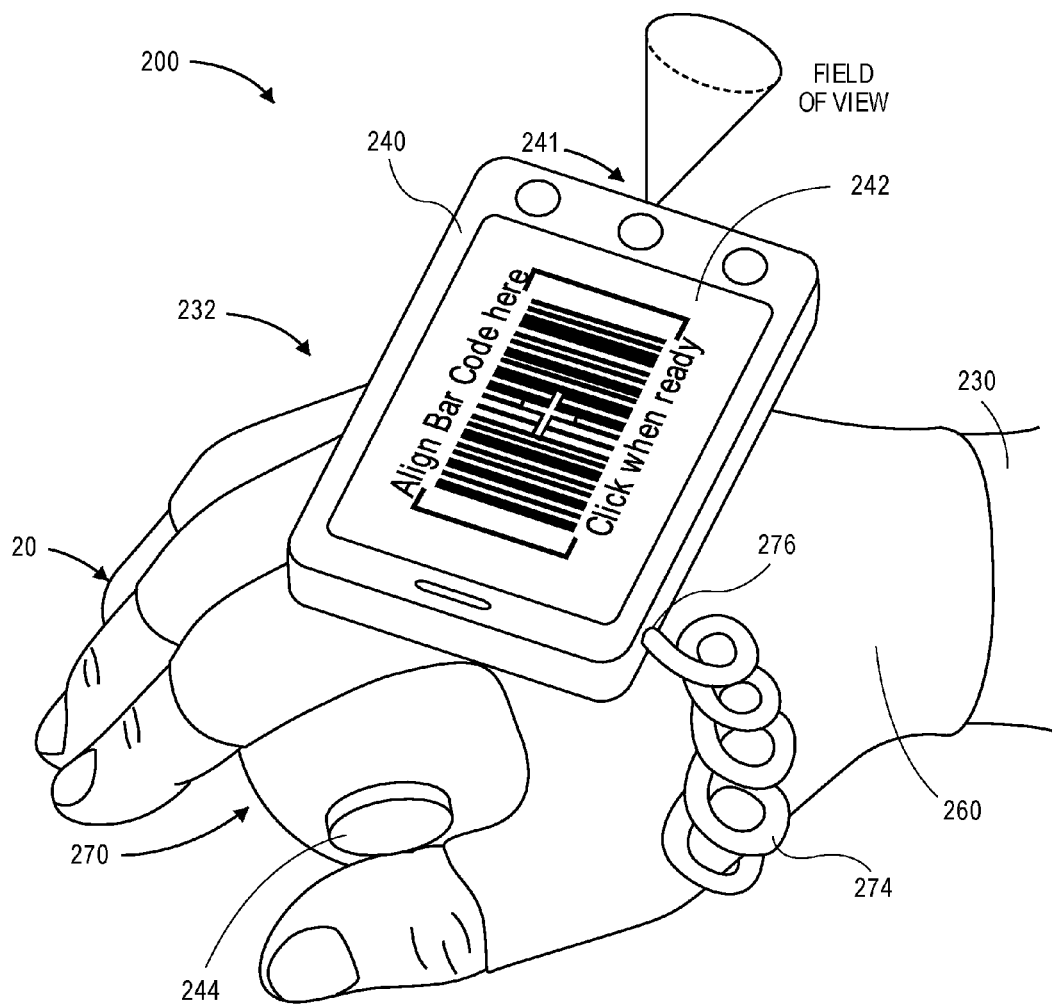
FIGS. 2A, 2B, 2C, 2D, 2E and 2F are views of systems including wearable scanners, or components thereof, in accordance with embodiments of the present disclosure.

Referring to FIG. 2A, a perspective view of the system 200 is shown. The system 200 includes a combined computing device 232 and scanning device 240 mounted to a glove 260 or other wearable apparatus or article of apparel worn about a right hand 20 of a user 230. The scanning device 240 includes an optical reader 241 having a field of view oriented in a defined direction with respect to the scanning device 240 and the optical reader 241, as well as a display screen 242. For example, as is shown in FIG. 2A, an axis of the field of view of the optical reader 241 is oriented laterally and substantially perpendicularly with respect to an axis of the hand 20 of the user 230. Additionally, the scanning device 240 further includes a substantially spherical ball implement 270 held within a palm, or an anterior, of the right hand 20 of the user. The ball implement 270 includes an actuator 244 for the scanning device 240. The ball implement 270 and the actuator 244 may be coupled, linked or otherwise tethered to the scanning device 240 via a connector (or cord) 274 having a plug 276 or other insert that may be received by or joined to the scanning device 240.

The optical reader 241 may be pointed or directed, by motion of the hand 20, to place a marking (e.g., codes, text, numbers, symbols, trademarks, shapes, outlines or figures) within a field of view of the optical reader 241. The optical reader 241 may thus obtain images or imagery, which may be captured by the scanning device 240 upon an initiation of the actuator 244, presented on the display 242, evaluated on the computing device 230, or transmitted for evaluation to one or more other computing devices. Moreover, in addition to image-capturing features, the optical reader 241 may further include one or more components for projecting light-based (e.g., laser) crosshairs, boxes, frames or other visual guides for aligning a marking to be scanned within the field of view of the optical reader 241 in accordance with the present disclosure. Additionally, although the optical reader 241 shown in FIG. 2A is configured to capture images in a direction and/or along an axis that is oriented laterally with respect to an orientation of the hand of the user, those of ordinary skill in the pertinent art would recognize that the systems and methods disclosed herein are not so limited, and that optical readers may capture images in any direction or along any axis in accordance with the present disclosure.

The glove 260 may be a wearable mounting apparatus or article of apparel covering all or a portion of the hand 20 of the user 230, i.e., all or portions of the posterior and/or the anterior of the hand 20, and provides a sufficient surface or platform for mounting the scanning device 240 and enabling the user 230 to wear the scanning device 240 about the hand 20. The scanning device 240 may be releasably joined to the glove 260 by any universal means, such as a standard hook-and-loop fastening system (i.e., Velcro®), or a stitched frame or other mounting feature, that may be known to those of ordinary skill in the pertinent art. By enabling the scanning device 240 to be releasably joined to the glove 260, the systems and methods of the present disclosure permit the scanning device 240 to be utilized by multiple workers who may have differently sized hands 20, and may thus require differently sized gloves 260, or for workers who may desire to wear a different glove 260 from their co-workers (e.g., for sanitary reasons). As is shown in FIG. 2A, the glove 260 is substantially fingerless, although any form of glove, including a glove which covers more or less of the hand 20 than the glove 260 of FIG. 2A (e.g., gloves which completely cover fingers), may be utilized for enabling the user 230 to functionally wear the scanning device 240 in accordance with the present disclosure.

Alternatively, or instead of the glove 260, the scanning device 240 may be mounted about the metacarpal bones of the hand, about the radius and ulna bones of the arm (i.e., in a vicinity of a wrist), or about another part or extension of the body of the user 230 (e.g., a leg), using one or more straps or other like features, which may be formed from any suitable synthetic or natural materials such as leather, cloth, fabric, nylon or elastics, and joined together using any type of fastener, including buckles, snaps or hook-and-loop fasteners. Any type of wearable mounting apparatus may be used to enable a user 230 to wear the scanning device 240, accordance with the present disclosure.

As is discussed above, the scanning device 240 may be worn by the user 230 in a versatile manner during the performance of one or more activities or evolutions, including such activities or evolutions which may or may not relate to the scanning of markings on items, and may aid or complement the performance of such activities or evolutions. Moreover, when the user 230 wears the scanning device 240 during activities or evolutions that are unrelated to the scanning of markings on items, the display screen 242 may display information relating to such activities or evolutions to the user 230.

Figure 2B:
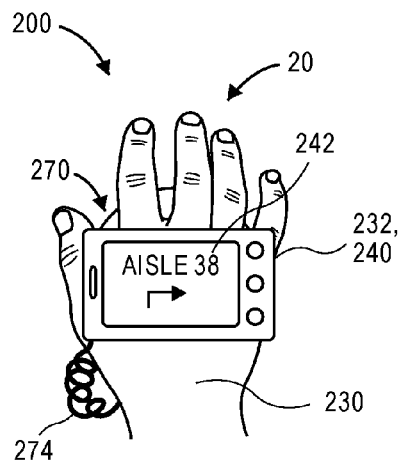
Figure 2C:
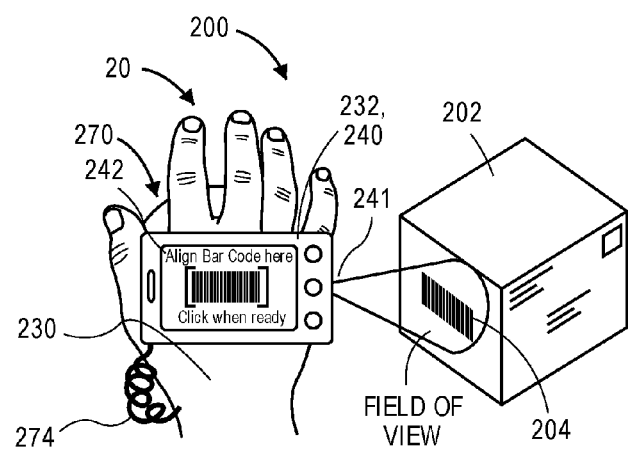

Referring to FIG. 2B, the scanning device 240 is shown mounted to the hand 20 of the user 230, having navigational instructions displayed on the display 242. The user 230 may thus view and follow the instructions shown on the display 242 of FIG. 2B, or other instructions, during the performance of one or more activities. Referring to FIG. 2C, the scanning device 240 is shown mounted to the hand 20 of the user 230 during a scanning evolution. The scanning device 240 is shown as scanning a marking 204 on a parcel 202. The user 230 may thus view a rendering of the marking 204 on the display 242, and orient the scanning device 240, as necessary, to cause the marking 204 to be squarely placed within the field of view of the optical reader 241.

Figure 2D:
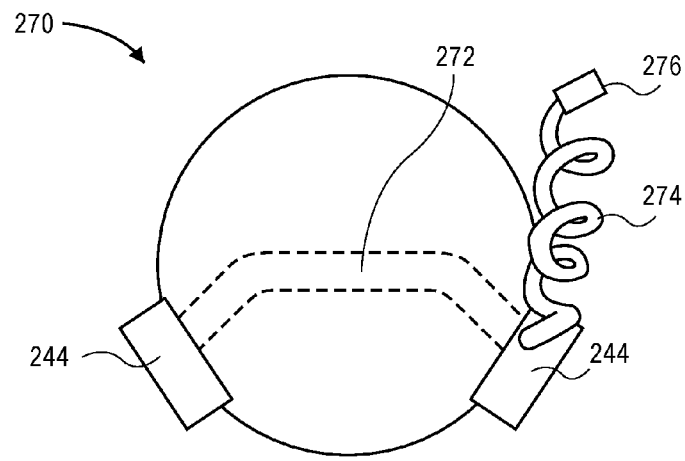

Referring to FIG. 2D, a side view of the ball implement 270 of the scanning device 240 is shown. The ball implement 270 includes a conduit 272 linking two actuators 244, which may take the form of a button or other like feature, and may be operatively connected to the scanning device 240 by a connector or cord 274 and/or a plug 276. As is shown in FIG. 2A, the actuator 244 may be easily accessed and operated by a finger of the hand 20 (viz., the thumb) when the scanning device 240 is used by the user 230, in order to initiate or cause a scanning or reading of a marking within a field of view of the optical reader, such as the marking 204 on the parcel 202 of FIG. 2C, and one or more signals associated with the operation of the actuator 244 may be provided from the ball implement 270 to the scanning device 240 by way of the cord 274 and/or the plug 276.

The two actuators 244 provided in the ball implement 270 of FIG. 2D may perform the same functions when actuated, or may be independently provided with discrete functionality, in accordance with the present disclosure. For example, one of the actuators 244 may provide operative functionality, i.e., may execute a task or function upon an actuation, while another of the actuators 244 may provide contextual functionality, i.e., may cause a menu to be displayed, or another context-based task to be performed, upon an actuation. Moreover, the functionality of each of the actuators 244 may be modified based on a specific application in which the ball implement 270 is used. For example, the actuators 244 may be configured in one manner where the ball implement 270 is configured for use by a left hand, i.e., such that an actuator 244 nearest a left thumb provides operative functionality and an actuator 244 opposite the left thumb provides contextual functionality, and may also be configured in another manner where the ball implement 270 is configured for use by a right hand, i.e., such that an actuator 244 nearest a right thumb provides operative functionality and an actuator 244 opposite the right thumb provides contextual functionality. The functionality associated with each of the actuators 244 may be defined in any manner in accordance with the present disclosure, such as by one or more software applications.

The ball implement 270 may be formed from any flexible, elastic materials known to those of ordinary skill in the art. The materials from which the ball implement 270 is formed may be selected based on their properties of compressibility, reformability and elastic deformation, as well as their properties of friction with standard objects (e.g., boxes, crates, handles or bars) with which the ball implement 270 may be expected to encounter during operation. Some such materials may include pliable and deformable rubbers having the composition and shape of a standard racquetball, through which the conduit 272 may be formed, while still other materials may include leather or leather substitutes having air or any other form of filler (e.g., foam or padding). Additionally, the ball implements 270 disclosed herein may further contain a sealed liquid. Preferably, the ball implement 270 may be compressed by forces provided by the user 230 during physical activities that may or may not be related to the use of the scanning device 240, such the carrying of objects with the hand 230, or the pushing of transportable vehicles (e.g., carts or trucks), and may substantially reform to an original shape when the forces are eased.

Figure 2E:
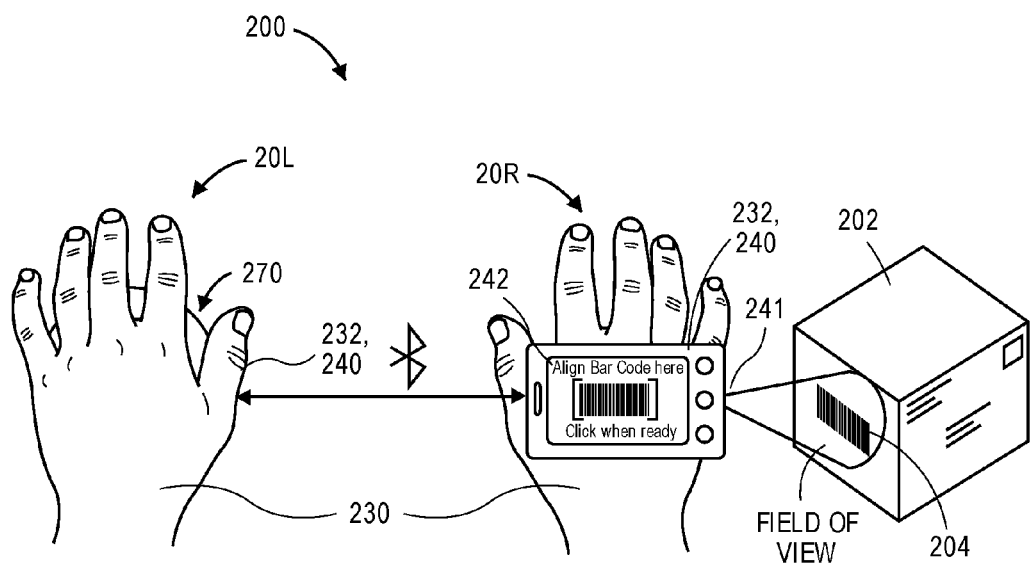

The ball implement 270 and the scanning device 240 may be connected by any wired or wireless means. Referring to FIG. 2E, a system 200 is shown. The system 200 includes a ball implement 270 mounted to a left hand 20L of a user 230, and a scanning device 240 mounted to a right hand 20R of the user 230. The ball implement 270 and the scanning device 240 are coupled, linked or otherwise connected via a wireless connection, e.g., a short-range or standard wireless connection. As is shown in FIG. 2E, an actuation of the actuator 244 on the ball implement 270 in the left hand 20L may cause a scanning or reading of a marking within a field of view of the optical reader of the scanning device 240 in the right hand 20R, such as the marking 204 on the parcel 202 of FIG. 2E.

Figure 2F:
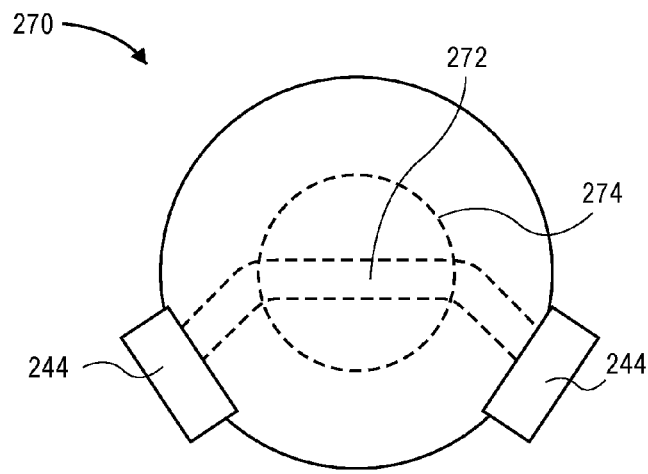

The ball implement 270 may include any form of wireless communication device or feature for transmitting signals associated with the actuation of the actuator 244. Referring to FIG. 2F, a side view of the ball implement 270 of FIG. 2E of the scanning device 240 is shown. The ball implement 270 includes a conduit 272 linking two actuators 244, which may take the form of a button or other like feature, as well as a wireless device 274. As is shown in FIG. 2E, the actuator 244 may be easily accessed and operated by a finger of the left hand 20L (viz., the thumb) when the scanning device 240 by the user 230, in order to initiate or cause a scanning or reading of a marking within a field of view of the optical reader, such as the marking 204 on the parcel 202 of FIG. 2E, and one or more signals associated with the operation of the actuator 244 may be provided from the ball implement 270 to the scanning device 240 by way of the wireless device 274.

Referring to FIGS. 3A, 3B, 3C and 3D, a system 300 including a wearable scanning device 340 is shown in operation. Except where otherwise noted, reference numerals preceded by the number "3" in FIG. 3A, 3B, 3C or 3D indicate components or features that are similar to components or features having reference numerals preceded by the number "2" in FIG. 2A, 2B, 2C or 2D, or components or features having reference numerals preceded by the number "1" shown in FIG. 1A or FIG. 1B.

Figure 3B:
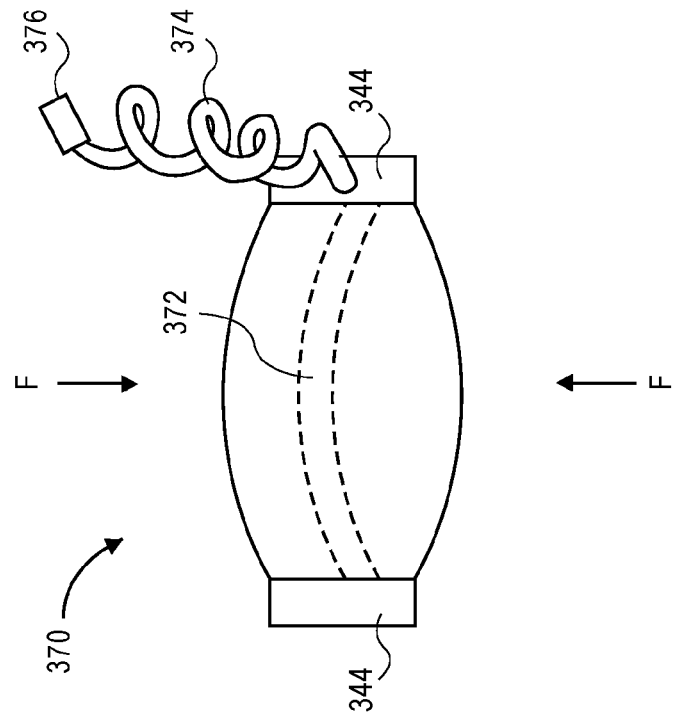
FIGS. 3A, 3B, 3C and 3D are views of systems including wearable scanners, or components thereof, in accordance with embodiments of the present disclosure.
Figure 3A:
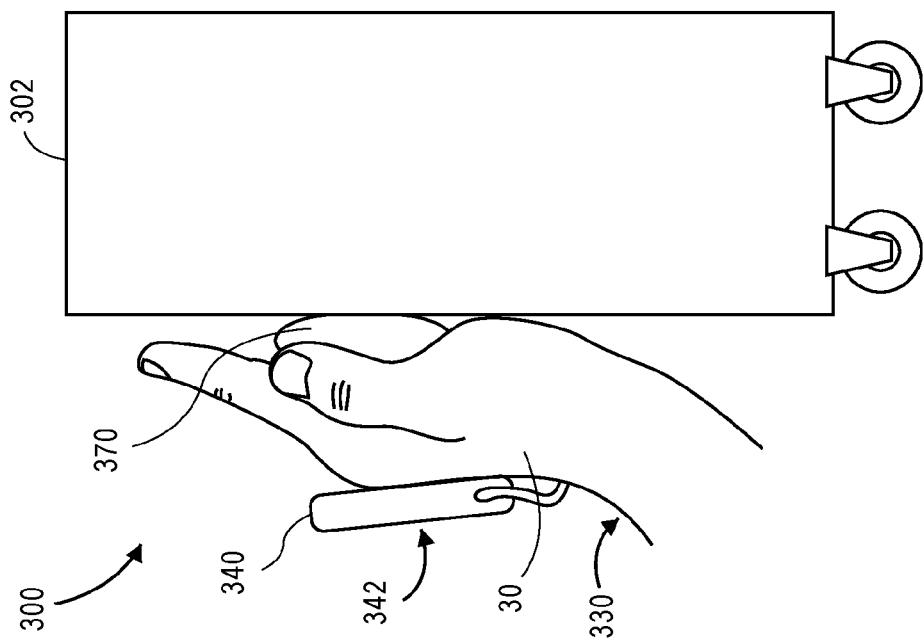

As is shown in FIG. 3A, the scanning device 340 is worn on a back, i.e., a posterior, of a hand 30 of a user 330 who is manually providing pressure, i.e., pushing, a cart 302 with a front, i.e., an anterior, of the hand 30. A ball implement 370 of the scanning device 340 is compressed between the hand 30 of the user 330 and the cart 302. As is shown in FIG. 3B, the ball implement 370 is compressed due to forces F applied on either side of the ball implement 370, thereby causing a flattening of the ball implement 370 and the conduit 372 therein.

Figure 3D:
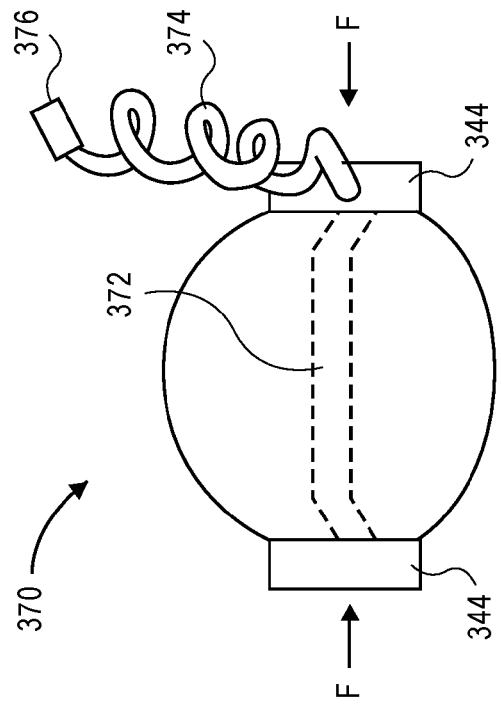
Figure 3C:
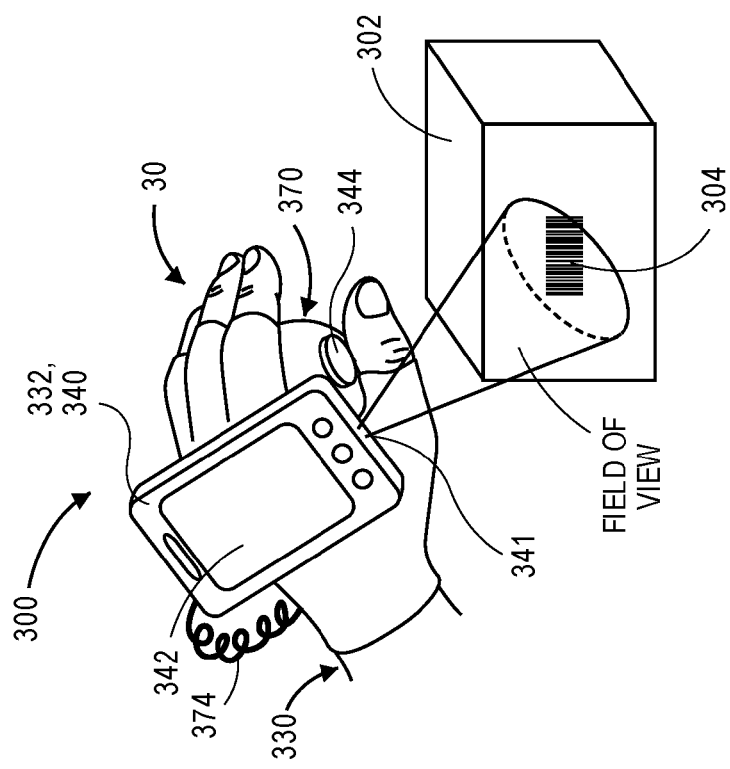

As is shown in FIG. 3C, the scanning device 370 is worn on the hand 30 of the user 330, as the user 330 is conducting a scanning evolution. The user 330 has oriented his or her hand 30 such that a marking 304 on a parcel 302 is within the field of view of an optical reader 341. A ball implement 370 having an actuator 344 is within the hand 30 of the user 330. When the marking 304 is appropriately represented in a display 342 of the scanning device 340, the user 330 may depress an actuator 344 on the ball implement 370, thereby sending a signal to the scanning device 340 via connector 374 and/or plug 376, and causing the scanning device 340 to capture and analyze an image of the marking 304. As is shown in FIG. 3D, the ball implement 370 is substantially uncompressed, although the user 330 may trigger the actuators 344 by applying forces F on either side of the ball implement 370.

Accordingly, the systems and methods of the present disclosure which utilize a scanning device mounted to a back, or a posterior, of a user's hand and having an actuator provided in a palm, or an anterior, of the user's hand, i.e., an actuator 244, 344 associated with the ball implements 270, 370 of FIG. 2A-2D or 3A-3D, may enable the user to participate in multiple activities or evolutions and also conduct scanning operations, as required, without having to independently retrieve, manipulate, orient and actuate a discrete scanning device.

Figure 4A:
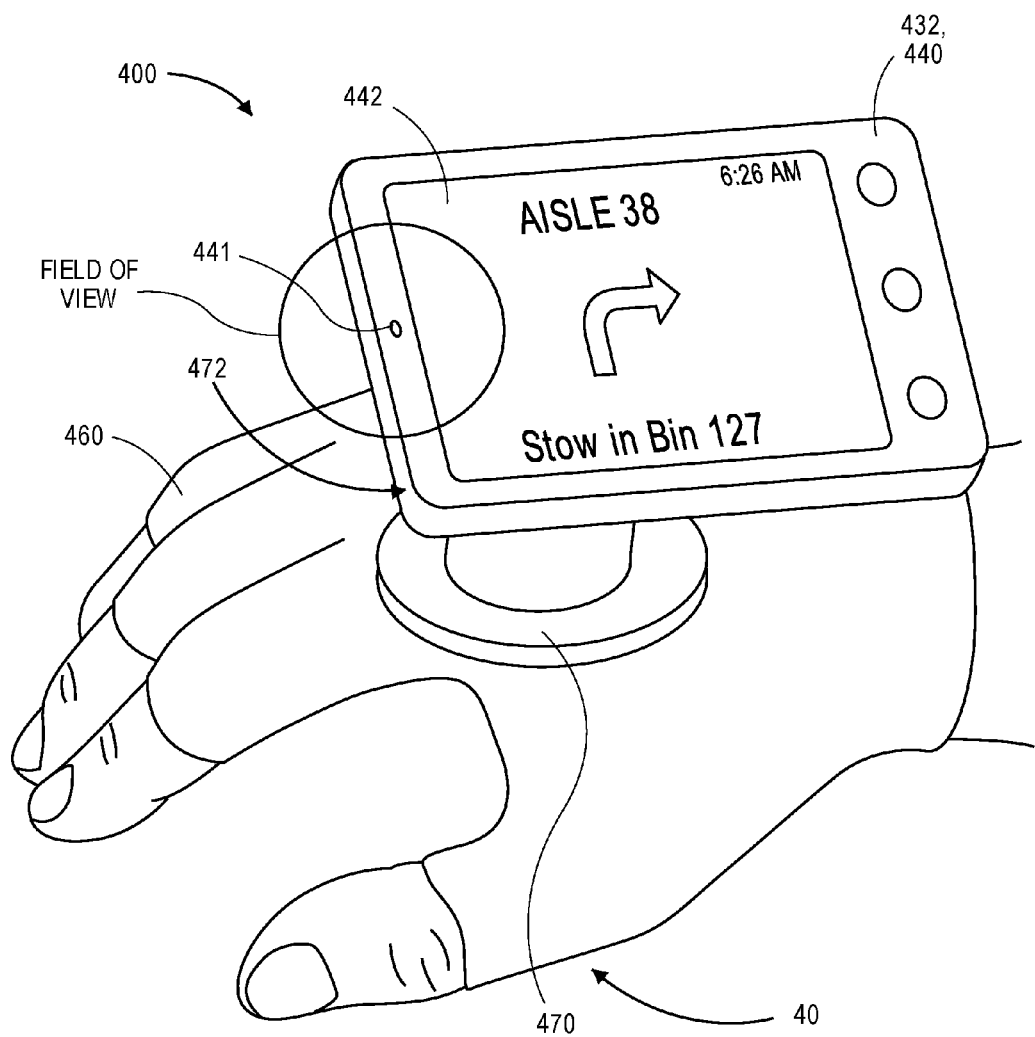
FIGS. 4A and 4B are views of systems including wearable scanners, or components thereof, in accordance with embodiments of the present disclosure.
Figure 4B:
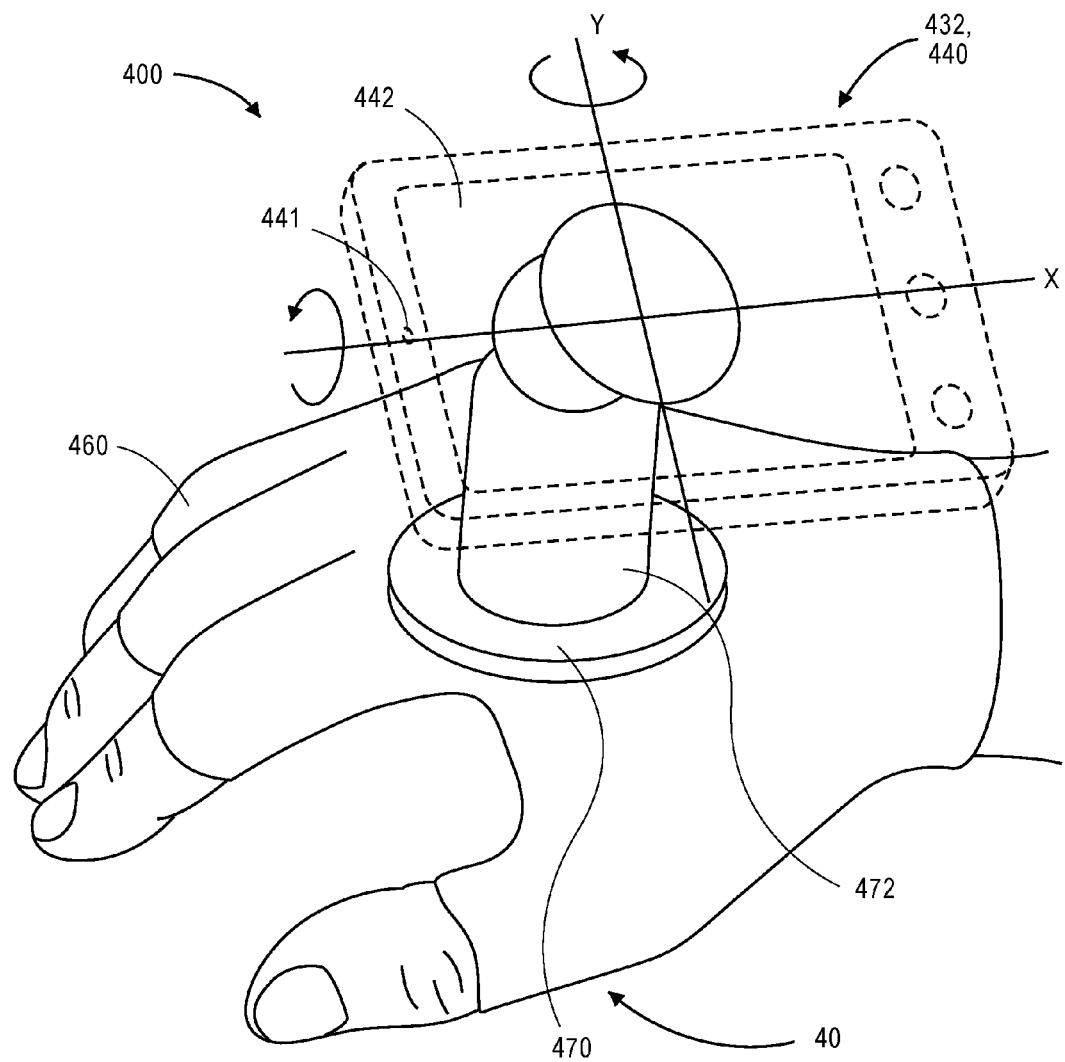

As is discussed above, some embodiments of the present disclosure feature wearable scanning or reading devices having associated display screens, which are adapted or configured to automatically orient themselves to maintain a user's face within a field of view of the display screens. Referring to FIGS. 4A and 4B, a system 400 including a wearable scanning device 440 is shown in operation. Except where otherwise noted, reference numerals preceded by the number "4" in FIG. 4A or 4B indicate components or features that are similar to components or features having reference numerals preceded by the number "3" in FIG. 3A, 3B, 3C or 3D, components or features having reference numerals preceded by the number "2" in FIG. 2A, 2B, 2C or 2D, or components or features having reference numerals preceded by the number "1" shown in FIG. 1A or FIG. 1B.

As is shown in FIG. 4A, a perspective view of the system 400 includes a combined computing device 432 and scanning device 440 fixed to an automated mount 470 on a glove 460 worn about a right hand 40 of a user 430. The scanning device 440 includes a camera 441 oriented with a field of view pointing toward a face of the user 430 and a display screen 442, which displays navigational information to the user. The automated mount 470 includes mechanized equipment for causing a repositioning of the scanning device 440.

According to some embodiments of the systems and methods of the present disclosure, the camera 441 of the scanning device 440 may continuously capture video imagery, and may analyze the captured video imagery in an attempt to identify one or more faces, facial features or elements of heads expressed therein, according to one or more facial detection or recognition algorithms. The scanning devices 440 of the present disclosure may further determine an orientation of the scanning device 440 and/or the display screen 442, as well as an orientation of any faces, facial features or heads recognized therein, in order to determine whether the faces, facial features or heads are oriented within a field of view of the camera 441, or is facing toward the field of view of the camera 441, which corresponds to a field of view of the display screen 442 when the camera 441 is mounted to or associated with a front face of the scanning device 440, as is shown in FIG. 4A. The capturing or analysis of the video imagery may be triggered by any manual or automatic means, including in response to a signal from a motion detector, a light sensor or any other computer-based monitoring system.

Once a position and/or orientation of the faces, facial features or heads within the field of view of the camera 441 are determined, the scanning device 440 may be reoriented to direct the display screen 442 toward a face of the user 430. Referring to FIG. 4B, a perspective view of the system 400 including the scanning device 440 fixed to the automated mount 470 having a rotatable turret 472 and a pivotable frame 474 on the glove 460 is shown. As is shown in FIG. 4B, the automated mount 470 may include a motor mount assembly adapted to rotate or pivot about multiple axes, including an x-axis or a y-axis, with respect to the display screen 442. For example, the automated mount 470 may include one or more electric motors (e.g., servo motors) to rotate the rotatable turret 472, or to pivot the pivotable frame 474, as needed to maintain the user's face within the field of view of the display screen 442. Such motors may be automatically operated in response to an identification of an orientation of a face, or on any other basis.

Figure 5B:
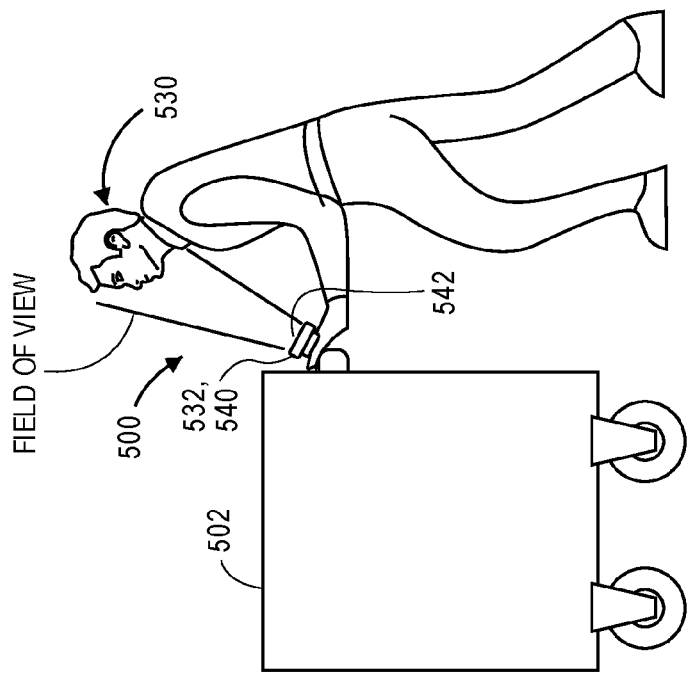
FIGS. 5A and 5B are views of systems including wearable scanners, or components thereof, in accordance with embodiments of the present disclosure.
Figure 5A:
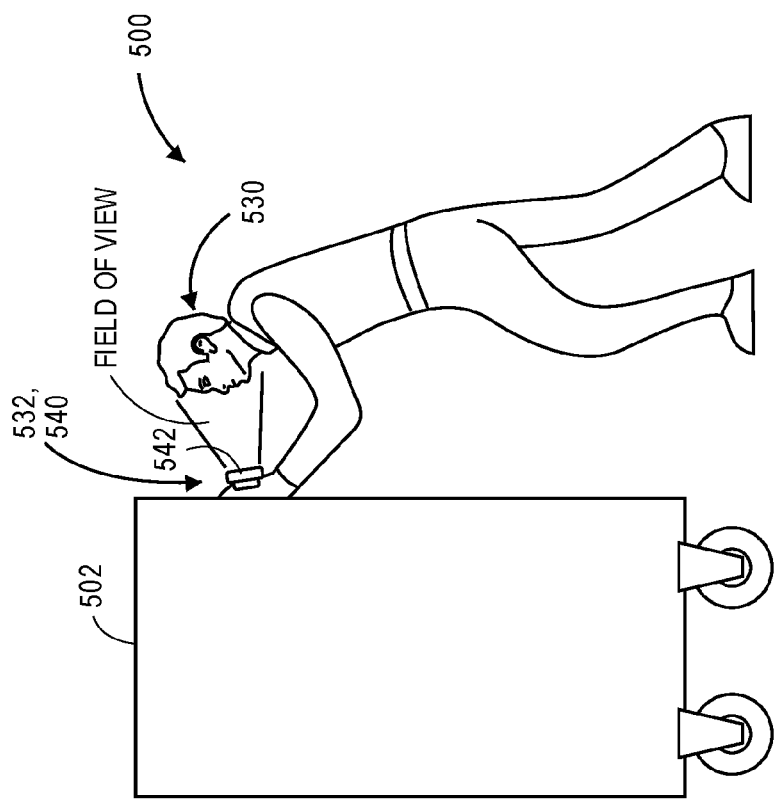

Referring to FIGS. 5A and 5B, a system 500 including a wearable scanning device 540 is shown in operation. Except where otherwise noted, reference numerals preceded by the number "5" in FIG. 5A or 5B indicate components or features that are similar to components or features having reference numerals preceded by the number "4" in FIG. 4A or 4B, components or features having reference numerals preceded by the number "3" in FIG. 3A, 3B, 3C or 3D, components or features having reference numerals preceded by the number "2" in FIG. 2A, 2B, 2C or 2D, or components or features having reference numerals preceded by the number "1" shown in FIG. 1A or FIG. 1B.

The systems and methods of the present disclosure may automatically orient a device having a display screen thereon in order to maintain the display screen within a convenient orientation with respect to a face of a user wearing the device on his or her body. As is shown in FIG. 5A, a user 530 may wear a computing device 532 and/or scanning device 540 having a display screen 542 while performing manual labor, such as by pushing a tall cart 502. The scanning device 540 maintains a face of the user 530 within a field of view of a camera 541. Thus, when the scanning device 540 is maintained in the position shown in FIG. 5A, the display screen 542 is oriented directly in front of the face of the user 530. Similarly, as is shown in FIG. 5B, when the user 530 performs a different task of manual labor, such as by pushing a short cart 502, the scanning device 540 may reorient itself to maintain the display screen 542 for easy viewing by the user 530. For example, the scanning device 540 may capture one or more video images of a face of the user 530 using the camera 541, analyze the video images to determine an orientation of the face, and provide a signal to the automated mount 470 to cause one or more motors associated with the rotatable turret 472 or the pivotable frame 474 to position the scanning device 540 in a manner that places the display screen 542 in an easily viewable orientation for the user.

Accordingly, the systems and methods of the present disclosure may be used to provide a wearable computing device or a scanning device having a self-correcting mount that causes a display screen on the computing device or the scanning device to continuously determine a placement of a user's face, and to reposition the display screen in a favorable orientation with respect to the user's face.

Figure 6A:
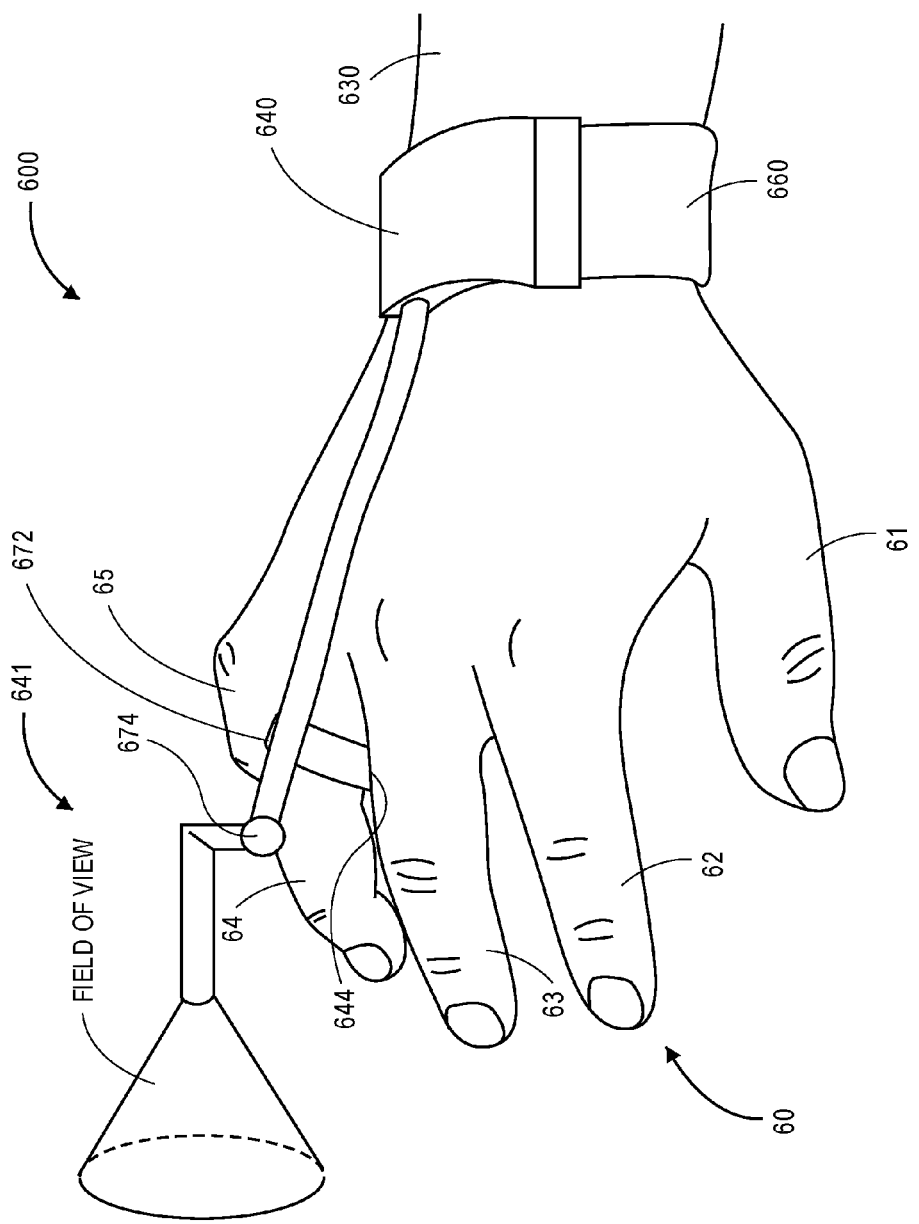
FIGS. 6A and 6B are views of systems including wearable scanners, or components thereof, in accordance with embodiments of the present disclosure.
Figure 6B:
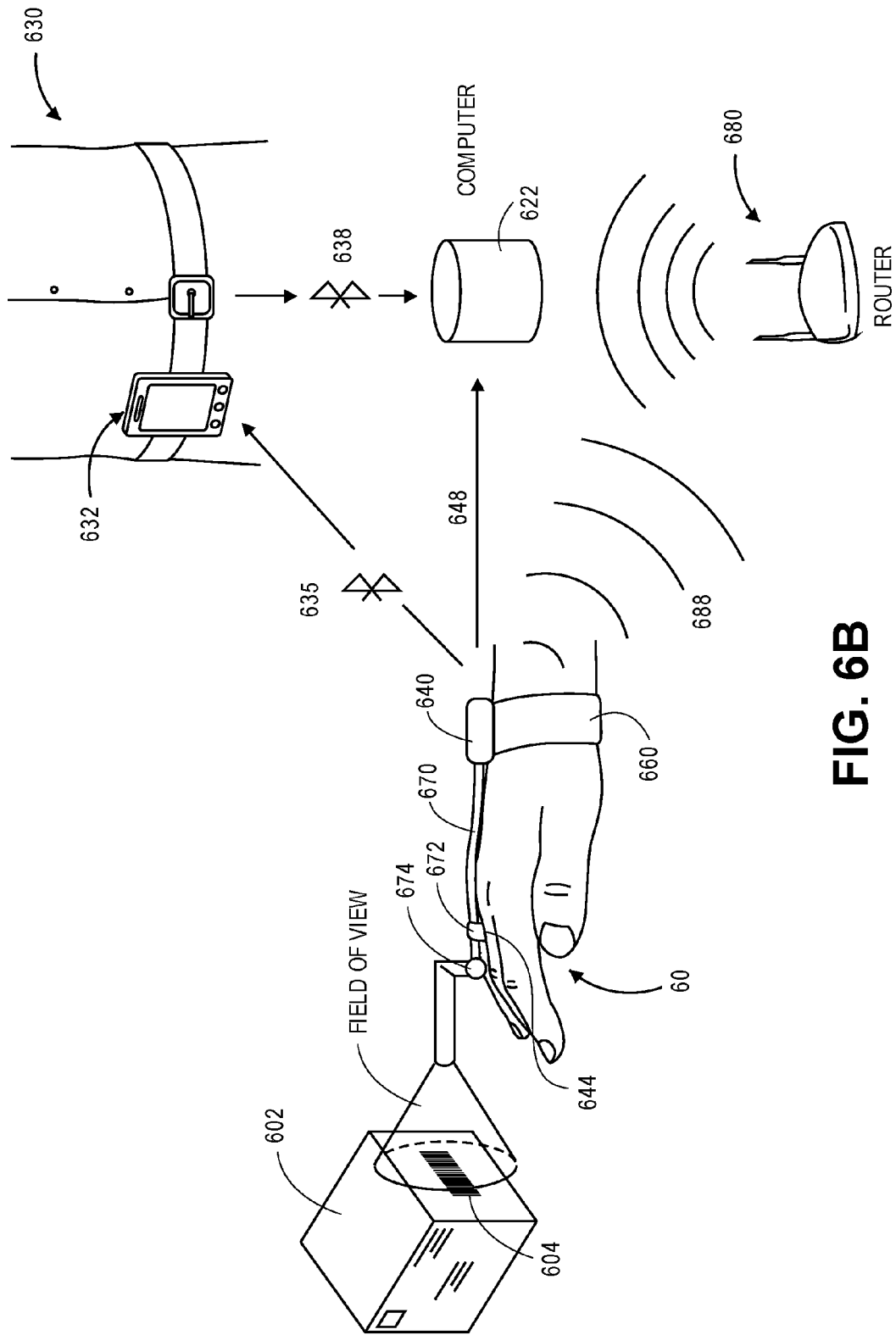

As is also discussed above, some embodiments of the present disclosure provide wearable scanning or reading devices having optical elements that may be mounted about or associated with a digit of a user's hand. Such devices may include actuators that are accessible to or operable by the digit. Referring to FIGS. 6A and 6B, a system 600 including a wearable scanning device 640 is shown in operation. Except where otherwise noted, reference numerals preceded by the number "6" in FIG. 6A or 6B indicate components or features that are similar to components or features having reference numerals preceded by the number "5" in FIG. 5A or 5B, components or features having reference numerals preceded by the number "4" in FIG. 4A or 4B, components or features having reference numerals preceded by the number "3" in FIG. 3A, 3B, 3C or 3D, components or features having reference numerals preceded by the number "2" in FIG. 2A, 2B, 2C or 2D, or components or features having reference numerals preceded by the number "1" shown in FIG. 1A or FIG. 1B.

As is shown in FIG. 6A, the system 600 includes the wearable scanning device 640 mounted about a wrist (i.e., about the radius and ulna bones) of a user 630 by a strap 660. The scanning device 640 includes an optical element 641 extending above, forward and beyond a hand 60, and is mounted to the wrist of the user 630. For example, the optical element 641 may be provided at an altitude or elevation above a finger of the hand 60 that is sufficiently large to ensure that the hand 60 may be utilized without damaging one or more aspects of the optical element 641, or without interference from the optical element 641, or sufficiently small to ensure that the field of view closely coincides with an axis or direction defined by the hand 60, or a finger to which the optical element 641 is mounted, viz., a finger 64 of the hand 60 in FIG. 6A. In some embodiments, the optical element 641 may be provided at an altitude or elevation of approximately one millimeter above the finger 64, although any altitude or elevation may be provided.

Additionally, the optical element 641 includes a ring mount 672 on the finger 64 having an actuator 644 mounted therein, and a flexible elbow 674 that allows for an adjustment of the alignment of the optical element 641 and the field of view extending therefrom. In some embodiments, however, the actuator 644 may be provided on a finger other than the finger 64, on multiple fingers, or in any other location.

The optical element 641 may comprise any number of materials that permit light to be transferred from the field of view to the scanning device 640. For example, the optical element 641 may comprise a fiber optic connection to the scanning device 640 extending through the elbow 674 or various flexible or rigid structural components that may form a sheath or other protective barrier associated with the optical element 641. Additionally, the optical element 641 may be formed from a sufficiently flexible material that permits the optical element 641 to conform to a posterior of the hand 60. The elbow 674 may comprise a hinge or other flexible angular device for changing an orientation of the connection.

The actuator 644 may be a button or other pressure-actuated sensor mounted within or adjacent to the ring mount 672, such that the actuator 644 is operated when depressed by a finger 64 within the ring mount 672, viz., the ring finger 64 of the hand 60 shown in FIG. 6A. In this regard, a user 630 of the scanning device 640 may use his or her hand 60 to point or orient the optical element 641 toward a marking 604 on a parcel 602 or other object, and may efficiently and easily initiate a scanning or reading of the marking 640 with a slight movement of the finger 64. Information regarding the marking 604 may be returned to the scanning device 604 via the optical element 641 and transmitted to another computer device or system (not shown) for analysis.

Although the scanning device 640 of FIG. 6A is shown as mounted to a wrist of the user 630, i.e., around the radius and ulna bones of the user 630, with a strap 660, the systems and methods of the present disclosure are not so limited, and may be mounted about any portion of a user's body, i.e., about the metacarpal bones of the user's hands, using a strap or any other like device. Additionally, although the ring mount 672 is shown mounted to the ring finger 64 of the hand 60 in FIG. 6A, those of ordinary skill in the pertinent art would recognize that the optical element 641 and/or the scanning device 640 need not include any ring mount 672 at all, and may instead provide an actuator 644 in any other location on the scanning device 640. Further, those of ordinary skill in the pertinent art would also recognize that scanning devices 640 may include mounts associated with one or all of the fingers 61, 62, 63, 64, 65 of the hand 60 of the user 630 in accordance with the present disclosure.

By providing an optical element 641 that extends to a region forward and beyond the scanning device 640, the mass and volume of the scanning device 640 may be minimized to include only the mandatory components therein that may be required to capture imagery associated with a marking, and to transmit the imagery to another device for processing. For example, in one embodiment, the scanning device 640 may consist of the optical element 641, the actuator 644, and any required transmitting equipment (e.g., a wireless transmitter) and power supply (e.g., a battery and/or capacitors), and need not include any display screens, memory devices or other peripherals. Furthermore, one or more of the components of the scanning device 640 may be provided in a common housing. In this regard, a lightweight scanning device 640 having a reduced or minimum size or number of components may be carried by a user 630 in the common housing, and operated more easily and effectively, than scanning or reading systems of the prior art.

The scanning device 640 of FIG. 6A may communicate with any number of computer-related devices or components regarding one or more markings scanned thereby, in order to permit such markings to be interpreted and analyzed. Referring to FIG. 6B, the system 600 of FIG. 6A is shown in operation. As is shown in FIG. 6B, the scanning device 640 is oriented to include a parcel 602 having a marking 604 (viz., a bar code) within a field of view of the optical device 641. The scanning device 640 is also shown in communication with any number of components or any number or type of networks. For example, the scanning device 640 may communicate with a computing device 632 that may be also worn or carried by the user 630, as is indicated by line 635, through a first network protocol, such as a short-range wireless network protocol. The scanning device 640 may also communicate with a computer 622 that may be operated in association with a fulfillment center, as is indicated by line 648, over a wired connection. The scanning device 640 may further communicate with a wireless router 680 that may be stationed in one or more locations, e.g., throughout a fulfillment center, as is indicated by line 688, through a second network protocol, such as a standard WiFi network protocol.

Furthermore, after the scanning device 640 has transmitted information regarding the markings, viz., the marking 604, to one or more other computer component, such other components may subsequently transmit such information to another computing component. For example, as is shown in FIG. 6B, the computing device 632 and/or the router 680 may transmit information regarding the markings to the computer 622 directly, as is indicated by lines 638 and 683, respectively. Alternatively, the computing device 632 and/or the router 680 may transmit such information to the computer 622 over any network, such as the Internet (not shown), and according to any network protocol.

Accordingly, the systems and methods disclosed herein may provide wearable scanning systems of compact sizes which may be mounted to or about a user's hand, or to or about a digit of the user's hand, and may include optical elements which may be easily oriented and initiated with a motion of a single finger. Furthermore, such scanning systems may include sufficiently autonomous features that may be used to transmit information regarding such markings to an external system for interpretation and analysis, thereby reducing the sizes of the equipment required in order to acknowledge and recognize one or more of such markings.

Figure 7A:
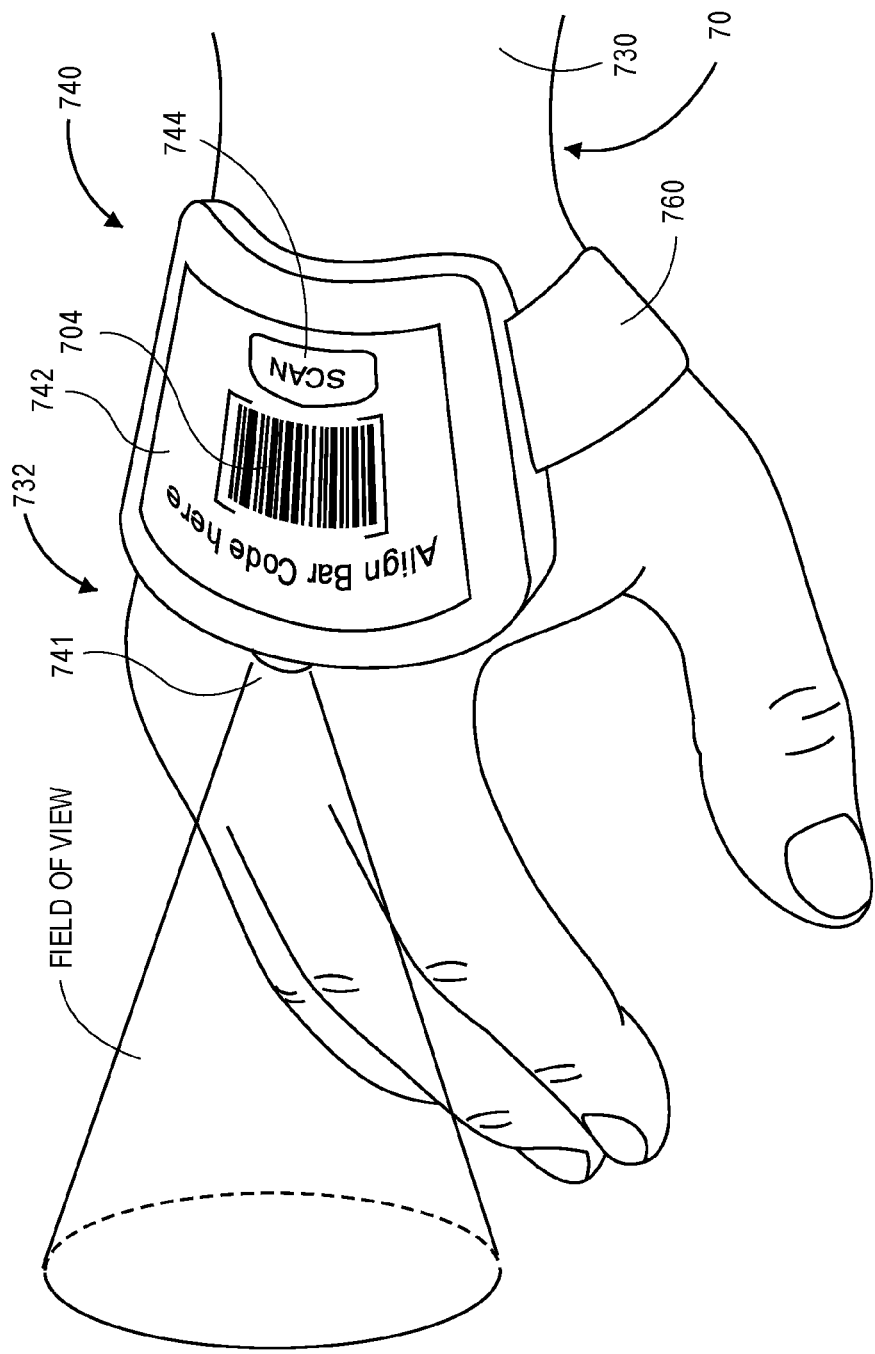

The systems and methods of the present disclosure may further provide arcuate or rounded displays that may readily conform to an extension of a user's body, such as a hand, another portion of an arm, or a leg. Referring to FIGS. 7A, 7B and 7C, a system 700 including a wearable scanning device 740 is shown in operation. Except where otherwise noted, reference numerals preceded by the number "7" in FIG. 7A, 7B or 7C indicate components or features that are similar to components or features having reference numerals preceded by the number "6" in FIG. 6A or 6B, components or features having reference numerals preceded by the number "5" in FIG. 5A or 5B, components or features having reference numerals preceded by the number "4" in FIG. 4A or 4B, components or features having reference numerals preceded by the number "3" in FIG. 3A, 3B, 3C or 3D, components or features having reference numerals preceded by the number "2" in FIG. 2A, 2B, 2C or 2D, or components or features having reference numerals preceded by the number "1" shown in FIG. 1A or FIG. 1B.

As is shown in FIG. 7A, the scanning device 740 includes an optical reader 741 and an arcuately shaped (i.e., convex) display screen 742, and is mounted to a back, or a posterior, of a hand 70 of a user 730. The optical reader 741 is aligned in a forward direction, thereby enabling the user 730 to direct the field of view of the optical reader 741 by aligning his or her hand 70 in the direction for which a scanning or reading is desired. For example, where a worker wearing the scanning device 740 of FIG. 7A locates an item having a marking of interest, the worker may point his or her arm in a direction of the marking, and capture one or more images of the marking for analysis.

As is shown in FIG. 7A, the display screen 742 may include any form of display element that may be temporarily or permanently curved or formed into a convex shape, i.e., a shape that mimics or otherwise conforms to a back (i.e., a posterior) of the user's hand 70. For example, the display screen 742 may include a permanently curved display element (e.g., glass or plastic) or, alternatively, of a flexible display element having flexible protective layers and/or backplane layers that are formed from plastic, metal, glass or polymeric materials, and may be bendable, rollable and lightweight. Furthermore, the display screen 742 may include any type of display screen, including a front-lit display, an E-ink display, an LCD, an LED, an OLED, or any other form of display element that may be formed or rounded into a convex shape, such as is shown in FIG. 7A. According to one embodiment, the display screen 742 may comprise an electrophoretic display.

Similarly, as is also shown in FIG. 7A, an underside of the scanning device 740 may be formed in a concave shape, also for the purpose of conforming to the back of the user's hand 70, from one or more plastic, metal, glass or polymeric materials. Some such materials include polyamides, polyesters, nylons, polyethylene napthalates, polyetherimides, polyether ether ketone (or "PEEK"), or other like materials. In this manner, the scanning devices 740 of the present disclosure may be more durable and reliable, and more readily able to absorb shocks or rigorous impacts.

Referring to FIG. 7B, the scanning device 740 of FIG. 7A is shown in operation. As is discussed above, the scanning device 740 may be oriented toward an object 702 (i.e., a parcel) having a marking 704 thereon by pointing or otherwise aligning a hand 70 of a user 730 about which the scanning device 740 is mounted toward the object 702, and thereby placing the marking 704 within a field of view of the optical reader 741. Thus, the field of view extends from the optical reader 741 along an axis that is substantially parallel to an axis of the arm or hand 70 of the user 730. Additionally, referring to FIG. 7C, a front view of the scanning device 740 of FIG. 7A is shown. The arcuate shape of the scanning device 740 and the continuous loop nature of the strap 760, which may be formed from any suitable materials and joined with any type of fastener.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments described herein or shown in the accompanying figures refer to scanning or reading bar codes applied or affixed to items at a facility controlled by an online marketplace, such as a fulfillment center, the systems and methods disclosed herein are not so limited, and may be utilized in connection with any scanning or reading evolution involving any type of marking, including but not limited to codes, text, numbers, symbols, trademarks, shapes, outlines or figures, or any other form of marking.

Those of ordinary skill in the pertinent art will recognize that aspects, features, components or parts of the various embodiments disclosed herein are interchangeable and may be used in connection with one or more other embodiments. For example, those of ordinary skill in the pertinent art would recognize that the ball implement 270 of FIGS. 2A-2F, or like implements and/or actuators, may be incorporated into or utilized with the wearable scanning device 440 of FIGS. 4A and 4B, the wearable scanning device 640 of FIGS. 6A and 6B or the wearable scanning device 740 of FIGS. 7A-7C. Similarly, those of ordinary skill in the pertinent art would further recognize that the automated mount 470, the rotatable turret 472 and/or the pivotable frame 474 of FIGS. 4A and 4B, or like mounts and/or features, may be incorporated into or utilized with the wearable scanning device 240 of FIGS. 2A-2F, the wearable scanning device 640 of FIGS. 6A and 6B or the wearable scanning device 740 of FIGS. 7A-7C.

Further, those of ordinary skill in the pertinent art would also recognize that the optical element 641, the actuator 644, the strap 660 or the flexible elbow 674 of FIGS. 6A and 6B may be incorporated into or utilized with the wearable scanning device 240 of FIGS. 2A-2F, the wearable scanning device 440 of FIGS. 4A and 4B or the wearable scanning device 740 of FIGS. 7A-7C. Finally, those of ordinary skill in the pertinent art would recognize that the arcuately shaped (i.e., convex) scanning device 740 and display screen 742 of FIGS. 7A-7C may be incorporated into or utilized with the wearable scanning device 240 of FIGS. 2A-2F, the wearable scanning device 440 of FIGS. 4A and 4B or the wearable scanning device 640 of FIGS. 6A and 6B.

Additionally, although some of the embodiments disclosed herein include optical readers or elements adapted to capture images in specific directions or along a specific axis, the systems and methods are not so limited, and any of the embodiments disclosed herein may include one or more optical readers or elements aligned to capture images in any direction or along any axis.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, an order in which steps of the methods or processes are listed is not intended to be construed as a limitation on the claimed inventions, and any number of steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A first computing system comprising:
a wearable mounting article adapted to be worn on at least a portion of at least one hand;
a frame having at least one computer processor and at least one memory device therein, wherein the frame is joined to the wearable mounting article;
a compressible implement adapted to be held within an anterior of the at least one hand;
at least one actuator associated with the compressible implement,
wherein the at least one actuator is in communication with the at least one computer processor.

2. The first computing system of claim 1, further comprising an optical element joined to the wearable mounting article.

3. The first computing system of claim 2, wherein the wearable mounting article further comprises a ring mount adapted to be worn about a finger of the at least one hand, and
wherein the optical element is joined to the ring mount.

4. The first computing system of claim 2, wherein the at least one memory device has computer instructions thereon, and
wherein the instructions are configured to cause the first computing system to perform a method comprising:
capturing, in response to an actuation of the at least one actuator, at least one image by the optical element;
determining that at least one item having at least one marking thereon is depicted in the at least one image; and
transmitting information regarding the at least one marking to a second computing device over a network.

5. The first computing system of claim 1, wherein the frame comprises a first surface formed in a concave shape conforming to the portion of the at least one hand,
wherein at least the first surface of the frame is formed from at least one of a polyamide, a polyester, a nylon, a polyethylene napthalate, a polyetherimide or a polyether ether ketone, and
wherein the frame is joined to the wearable mounting article on at least a portion of the first surface.

6. The first computing system of claim 5, wherein the frame further comprises a second surface having a display screen formed in a convex shape conforming to the portion of the at least one hand.

7. The first computing system of claim 6, wherein the display screen is an electrophoretic display.

8. The first computing system of claim 1, wherein the compressible implement comprises a sealed volume having a wireless transmitter therein,
wherein the at least one actuator is disposed on an outer surface of the sealed volume, and
wherein the at least one actuator is in communication with the at least one computer processor according to at least one wireless protocol via the wireless transmitter.

9. The first computing system of claim 8, wherein the wearable mounting article is adapted to be worn on at least the portion of a first hand, and
wherein the sealed volume of the compressible implement is adapted to be held within the anterior of a second hand.

10. The first computing system of claim 8, wherein the sealed volume is formed from at least one layer of at least one of a rubber, a leather or a leather substitute,
wherein the sealed volume comprises at least one filler therein, and
wherein the at least one filler is at least one of a gas, a liquid, a foam or a padding.

11. An implement comprising:
a sealed compressible volume adapted to be gripped within an anterior of a hand; and at least one actuator associated with the sealed compressible volume,
 wherein the at least one actuator is in communication with at least one computer processor.

12. The implement of claim 11, wherein the sealed compressible volume has a substantially spherical shape when the implement is not subject to at least one external compressive force.

13. The implement of claim 11, wherein the sealed compressible volume is formed from at least one layer of at least one of a rubber, a leather or a leather substitute,
 wherein the sealed compressible volume includes a filler within at least one layer, and
 wherein the filler is at least one of a gas, a liquid, a foam or a padding.

14. The implement of claim 11, further comprising:
 a cord having a first end coupled to the at least one actuator and a second end coupled to a computer device having the at least one computer processor.

15. The implement of claim 11, further comprising a wireless transmitter configured to communicate via at least one wireless protocol with a computer device having the at least one computer processor.

16. The implement of claim 11, wherein the at least one actuator is a button aligned with a thumb of the hand when the sealed compressible volume is gripped within the anterior of the hand.

17. A scanning system operatively connected to at least one network comprising:
 at least one wearable apparatus configured to be worn on at least a finger of a hand;
 an optical scanning element mounted to the at least one wearable apparatus, wherein the optical scanning element is joined to the finger of the hand;
 an actuator for causing at least one image to be captured by the optical scanning element, wherein the actuator is coupled to the optical scanning element; and
 an internal power supply.

18. The scanning system of claim 17, further comprising a compressible implement configured to be gripped within an anterior of the hand,
 wherein the compressible implement comprises a sealed volume formed from at least one of a rubber, a leather or a leather substitute and having a filler of at least one of a gas, a liquid, a foam or a padding therein, and
 wherein the actuator is associated with the compressible implement.

19. The scanning system of claim 17, further comprising:
 at least one computer processor; and
 at least one memory device having computer instructions stored thereon, wherein the instructions are configured to cause the scanning system to perform a method comprising:
  capturing, in response to an actuation of the actuator, the at least one image by the optical scanning element;
  determining that at least one item having at least one marking thereon is depicted in the at least one image; and
  transmitting information regarding the at least one marking to an external computing device over the at least one network.

20. The scanning system of claim 19, further comprising at least one computer display mounted to the at least one wearable apparatus, and
 wherein the method further comprises:
  receiving, from the external computing device, information regarding the at least one item; and
  causing a display of at least some of the information regarding the at least one item on the at least one computer display.

* * * * *